June 27, 1967  J. BAKKER ETAL  3,328,615
VIBRATING DEVICE
Filed April 1, 1963

INVENTORS:
Johannes Bakker
BY Joannes H. Bakker
Molte & Molte
Attorneys

United States Patent Office 3,328,615
Patented June 27, 1967

3,328,615
VIBRATING DEVICE
Johannes Bakker and Joannes H. Bakker, both of 19 Irenestraat, Son, North Brabant, Netherlands
Filed Apr. 1, 1963, Ser. No. 269,303
Claims priority, application Netherlands, Apr. 4, 1962, 276,815
7 Claims. (Cl. 310—80)

The invention relates to a vibrating device comprising a first semi-stationary body and a second body arranged so as to be movable with respect to the former, the first body comprising at least one permanent magnet and the second body comprising a plurality of permanent magnets.

In known devices of this type, the attractive and/or repelling forces are considered to be operative without the need for further means between the permanent magnets of the first and of the second body.

As far as the attractive forces are concerned, this might be feasible, since the field of the lines of force can be closed via the permanet magnet of the first body, via the frame of the second body and via the frame of the first body back to the permanent magnet of the first body. As far as the repelling forces are concerned, this is not possible, so that these forces are much smaller than the former.

Use could be made, of course, of the attractive forces only, but the repelling force must then be supplied by springs or other resilient or elastic material. If the vibrations to be produced by the device must have a high frequency, such repelling force is insufficient.

If, however, the motor driving the vibrating device is caused to perform a high number of revolutions per minute, the vibration dies out, since the damping produced by the elastic material becomes excessively great.

This disadvantage is overcome by the vibration device of the present invention in which in order to cause a substantially unilateral force (only an attractive force or only a repelling force) to be operative between a magnet of the first body and a magnet of the second body, the field of the lines of forces of each permanent magnet is closed in itself and is concentrated around the permanent magnet by surrounding the latter with ferromagnetic material so that on the side of the magnet facing the body in which it is not arranged, the permanent magnet projects beyond the ferromagnetic material, so that the field of lines of force traverses partly the air path between the ferromagnetic material and the permanent magnet.

The difficulty of producing repelling forces is not involved in the use of electro-magnets, since by the commutation of the electro-magnets (for instance by using a commutator) the action of the force can be alternated.

However, electro-magnets are more costly and more vulnerable, and require a vibrating device which must be of larger dimensions in order to accommodate the necessary electrical conductors and coils.

In order that the present invention may be readily carried into effect, it will now be described with reference to the accompanying drawings, in which.

Figure 1:
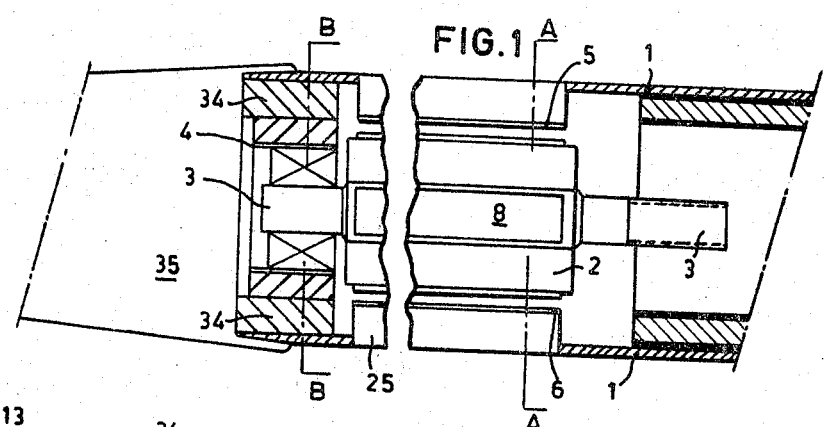
FIG. 1 is a side elevation of an embodiment of a vibrating device of the present invention.

The vibrating device illustrated in FIG. 1 comprises a stator body 1, the first body, in which a rotor body 2, the second body, is rotatably suspended. The suspension is achieved by means of a conventional arrangement of the shaft 3, at the end where it projects beyond the vibrating device, in a ball bearing (not shown) and at the other end in a member 4, to be described hereinafter.

The structure of the rotor body 2 and that of the stator body 1 will now be described with reference to FIG. 2. The stator body 1 consists of a hollow cylinder, in which two rod-shaped permanent magnets 5 and 6 are secured.

Figures 2, 3:
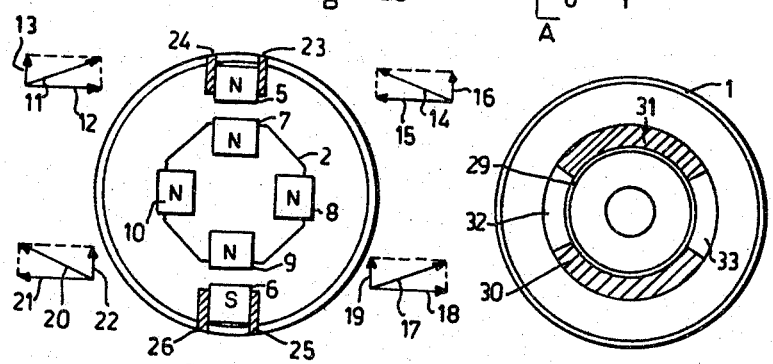
FIG. 2 is a sectional view taken along the lines A—A of FIG. 1.
FIG. 3 is a sectional view taken along the lines B—B of FIG. 1.

In FIG. 2 it is shown that the pole of the permanent magnet 5, facing the rotor body 2, is a North pole N, whereas the corresponding pole of the permanent magnet 6 is a South pole S.

The poles of the four rod-shaped permanent magnets 7, 8, 9 and 10, accommodate in the rotor body 2, which poles face the stator body 1, have the same polarity. These poles are indicated in FIG. 2 as North pole N for illustrative purposes, but it will be obvious that such four poles may also be South poles.

The choice of identical poles of the rotor body and the necessity for closing the field of the lines of force of each permanent magnet and the concentration thereof around each permanent magnet are a result of the following considerations.

It should first be noted that a vibration of the stator body in a radial direction is desirable, i.e. in a direction lying in the plane going through the permanent magnets 5 and 6 and the shaft 3 or in a plane at right angles thereto. This is particularly important when the vibrating device is employed for vibrating concrete, in which case the stator body is introduced into the still fluid concrete mass in order to cause it to vibrate.

It will be assumed that, similarly to the known device described in United States Patent No. 1,672,807, the poles of the rotor body 2 are not identical and that they alternate in polarity. In this case, the poles of the magnets 7 and 9 are South poles, whereas the poles of the magnets 8 and 10 are North poles, for example. In the position shown in FIG. 1 an attractive force must prevail between the magnets 5 and 7 and a repelling force between the magnets 6 and 9.

However, this force has an adequate strength only when both the field of the lines of force for the magnets 5 and 7 and that for the magnets 6 and 9 can be closed in themselves.

For the magnets 5 and 7 this might perhaps be achieved via the bodies 1 and 2, although this would create a difficulty, because there must be no additional forces which counteract the force directed upwardly.

With respect to the magnets 6 and 9 it is not at all possible to close the associated field of lines of force in itself.

When the rotor 2 performs a dextro-rotatory movement, the magnet 10 will be opposite the magnet 5 and the magnet 8 will be opposite the magnet 6 after a rotation of 90°. An attractive force between the magnets 6 and 8 must be operative, provided a satisfactory closure of the field of lines of force is possible and a repelling force between the magnets 5 and 10.

From the foregoing it will appear that with this disposition of the magnets the closure of the field of lines of force involves great difficulties, due to the fact that the unlike poles of the magnets 5 and 6 must provide the reciprocating movement.

If the magnet 5 were omitted, for instance, and if only North poles were used on the rotor body 2, there would nevertheless remain the difficulty of the closure of the field of lines of force, while only an attractive force would be operative, so that as hereinbefore mentioned the repelling force would have to be provided by resilient or elastic material, by means of which the shaft 3 is journalled in the device 4.

However, with this method of producing a vibratory movement, the resonance frequency is found to be excessively low, which is due to the resilient or elastic material. The resilient or elastic material determines the damping factor and the elasticity coefficient of the vibration equation and hence also the resonance frequency of the vibration to be produced.

Therefore, in accordance with the invention, a useful result is obtained only when the field of lines of force of each of the magnets 5 to 10 is closed in itself and the poles of the magnets 7 to 10 are identical i.e. have the same polarity. The provision of such closure in a suitable manner is described more fully hereinafter. Assuming that the closure is suitably affected, however, the vibrating device of FIGS. 1 and 2 operates as follows.

First the effect of the force between the magnet 5 and the magnets 7 to 10 and then that between the magnet 6 and the magnets 7 to 10 will be described.

With the dextro-rotatory movement of the rotor body 2, as hereinbefore supposed, as soon as each of the magnets 7 to 10 approaches the magnets 5 and 6 arrive within the range of action thereof.

On the basis of the position shown in FIG. 2 the magnet 10 approaches the magnet 5 and is exposed to a repelling force directly along the line of connection between the centers of the two magnets. As a matter of course, the reactive force exerted by the approaching magnet 10 on the stator magnet 5 is also directed along said line of connection.

For a given position of the magnets 10 and 5, this reactive force is indicated by the vector 11, indicated on the upper left of FIG. 2. If the rotor body 2 is supposed to be stationary (which does not mean a semi-stationary position as aforementioned), since the term semi-stationary relates to the fact that the stator 1 does not rotate, which is achieved by coupling the body 2 rigidly via the shaft 3 (right-hand side of FIG. 1) with the driving motor (not shown), the stator body 1 is urged in a direction indicated by the vector 11. The force directed along the vector 11 may be constituted by a horizontal force directed along the vector 12 and a vertical force of the vector 13. At the approach of the magnet 10 the horizontal force 12 will first predominate, and the vertical force 13 will be fairly small. As the magnet 10 approaches the magnet 5 more closely, the force 12 decreases and finally become zero, whereas the force 13 increases and finally reaches a maximum value.

After the magnet 10 has passed by the magnet 5, the horizontal force reverses and the vertical force starts decreasing. This may be accounted for in a simple manner by means the vector diagram on the upper right of FIG. 2. It is supposed that this vector diagram applies to the situation in which the magnet 10 is at a given distance on the right side from the magnet 5. The force tending to repel the stator body 1 then has the direction of the vector 14. The force 14 may be constituted by a horizontal force along the vector 15 and a vertical force along the vector 16.

At the moment of passing of the magnet 10 by the magnet 5, the force 15 is substantially equal to zero, the force 16 is at a maximum and of course equal to the maximum force 13. As the magnet 10 moves further away from the magnet 5, the horizontal force 15 increases, and the vertical force 16 decreases.

From the foregoing, it follows that the stator body 1 is subjected to a uniformly directed vertical force and to a horizontal force of variable direction. Since the fields of lines of force of the magnets 5 and 10 are closed in themselves, the region of action in which the aforedescribed forces appear is restricted to a range around the magnet 5. However, when the magnet 10 has passed by, the magnet 9 approaches the magnet 5, after which the aforedescribed process for the approach of the magnet 10 is repeated.

The same applies, of course, when the magnets 7 and 8 approach and pass by the magnet 5.

The influence of the permanent stator magnet 6 is identical to that of the magnet 5, the difference being, however, that the magnet 6 exerts an attractive force on the rotor magnets 7 to 10 instead of a repelling force.

The force to which the stator body 1 is subjected by the permanent magnet 6 contributes to that due to the magnet 5.

This may be explained as follows.

When the magnet 8 approaches the magnet 6, the stator body 1 is attracted in a direction along the vector 17, indicated on the lower right of FIG. 2. The force along the vector 17 may be constituted by two forces along the vectors 18 and 19. The force along the vector 18 is zero, when the magnets 8 and 6 pass by each other, whereas the force 19 is then at a maximum.

In a similar manner, the vector diagram with the vectors 20, 21 and 22 applies when the magnet 8 has passed by the magnet 6. In this case, a vertical force applies in one direction (19 and 22, respectively) and a horizontal force applies in opposite directions (18 and 21 respectively).

Since the magnets 7 to 10 are symmetrically positioned on the rotor body 2 and the magnets 5 and 6 are opposite each other, while the strengths of the various magnets are equal to each other, it will be obvious that when a rotor magnet, for instance the magnet 10, approaches the magnet 5 the force 12 at any instant is equal to the force 18 produced by the approach of the opposite rotor magnet, i.e. in this example the magnet 8, to the magnet 6.

The forces 15 and 21 are also equal to each other when the rotor magnets concerned have passed by the magnets 5 and 6. Thus, each time, the stator body 1 first moves to the left and subsequently moves to the right, when a rotor magnet passes by a stator magnet, and at the same time said stator body is continuously displaced in a vertical direction.

From the foregoing it will appear that the same horizontal vibratory movement of the stator body 1 can be produced, when one of the two stator magnets, for example the magnet 6, is omitted, but in this case the vibratory movement will have half the amplitude of the former movement. Moreover, the poles of the magnets 7 to 10 facing the stator body 1 may be South poles. The frequency of the vibration produced is equal to four times the number of per second revolutions of the rotor 2.

A first method of closing in itself the field of lines of force and of concentrating it around a permanent magnet so that the desirable effect of the forces between the stator magnet and the rotor magnet is obtained, is described with reference to FIG. 4, which shows the stator magnet 5 separately, for illustrative purposes.

This rod-shaped magnet 5 is clamped between two thin plates 23 and 24 of ferromagnetic material and is fastened, as will be seen from FIG. 2, together with said plates in the stator body 1. In a similar manner, the rod-shaped permanent magnet 6 is clamped tight between ferromagnetic plates 25 and 26 before it is fastened in the stator body 1. In order to avoid a magnetic short-circuit, layers of non-magnetic material may be provided between the plates 23 and 24 and the permanent magnet 5. With a thickness of the permanent magnet shown in FIG. 4 of 9 mm. the plates 23 and 24 have a thickness of 1.8 mm. The ratio between the thickness of the plates and the thickness of the permanent magnet is therefore 1.8 mm.: 9 mm.=0.2 mm.

The North pole N of the permanent magnet 5 projects slightly beyond the plates 23 and 24 so that the lines of force 27 and 28 emanating from the North pole N are compelled to pass partly through the air before they can enter the plates 23 and 24. They close the loop via the plates 23 and 24 and the South pole S of the magnet 5. The permanent magnet 5 projects about 1 to 2 mm. above the surrounding plates 23 and 24.

If steps are taken to provide that the field of lines of force of the rotor magnets 7 to 10 is shaped in the same form as that of the magnet 5, a strong concentration of the field of lines of force is obtained in the air gap between a stator magnet and a rotor magnet, when they are close to each other. This results in the aforedescribed effect.

The course of the lines of force of the permanent magnets 7 to 10 could be obtained in a manner similar to that of the magnets 5 and 6. However, to accomplish this, the rotor body 2 may be made wholly of ferromagnetic material and may be shaped in the form shown in FIG. 2.

For this purpose cavities are milled in the rotor body 2 for fastening the rod-shaped permanent magnets 7 to 10, if necessary surrounded by a layer of non-magnetic material, so that the magnets protrude slightly, for example 1 to 2 mm., from said rotor body. The rotor material is flattened at the side of these cavities over a small distance and milled away beyond this distance, so that the flat faces shown in FIG. 2 are formed at the sides of the permanent magnets 7 to 10 and away from said magnets the sides are slanting.

It is thus ensured that the lines of force emanate at right angles from the North poles N of the magnets 7 to 10 and enter at right angles in the material of the flat faces beside the magnets and not in the oblique sides, since otherwise the path through the air and hence the reluctance for the magnetic flux would become excessively great. Moreover, it is ensured by providing the oblique sides that the air gap between the rotor body and the permanent magnets 5 and 6 become larger when the latter are opposite the slanting sides, so that in these positions substantially no force prevails between the stator body and the rotor body.

As a matter of fact, the rotor body 2 could also be made of non-ferromagnetic material and the magnets 7 to 10 could be fastened in the same manner as the magnets 5 and 6. In this case, there is no need to mill away rotor material and the field of lines of force is closed by means of plates corresponding to the plates 23 to 26.

From the foregoing description it appears that the vibratory movement is principally in a direction at right angles to the plane through the rod-shaped magnets 5 and 6 and the shaft 3.

In order to achieve this movement, the shaft 3 is journalled in the device 4 in the manner illustrated in FIG. 3.

The shaft 3 is journalled in a ball bearing 29, which is suspended between two non-connected rubber blocks 30 and 31. The spaces 32 and 33 are thus provided.

Since the sectional view B—B is drawn in the same position as the sectional view A—A, it is obvious that the spaces 32 and 33 are provided so that the ball bearing 29, together with the shaft 3, is freely movable in a horizontal direction. The shape of the blocks 30 and 31 and the elasticity coefficient of the rubber of which these blocks are made must be chosen so that the freedom of movement is inhibited as little as possible, since the resonance frequency of the vibration produced also depends thereupon and this frequency should be as high as possible.

The suspension in the rubber blocks also serves to counteract the aforesaid, more or less continuously effective, vertical magnetic forces.

The shape of the block 30 and 31 also depends upon the direction of rotation of the rotor body 2. As a consequence, the direction of movement may not be accurately at right angles to the plane going through the permanent magnets 5 and 6 and the shaft 3, but may deviate therefrom.

Apart from the possibility of matching the shape of the blocks 30 and 31 to the direction of rotation, the device 4 may be positioned loosely in the tube 34. The device 4 is held by means of a helical spring (not shown) which permits a small movement to the left or to the right of said device in the plane of the drawing of FIG. 3, so that when the rotor body 2 is rotating, the recesses 32 and 33 can adjust themselves to obtain an optimum vibratory movement.

When the vibrating device of the present invention is used for producing vibrations in reinforced concrete, it is advisable to provide it with a vane 35 on the outside of the stator body 1. The vane 35 is located in a plane through the permanent magnets 5 and 6 and the shaft 3.

When the stator body 1 starts vibrating, the vane 35 will also vibrate. Due to its small thickness and its tapering shape, the vane 35 may be positioned between the reinforcing parts, so that the vibratory movement may be applied to inaccessible places.

Figure 4:
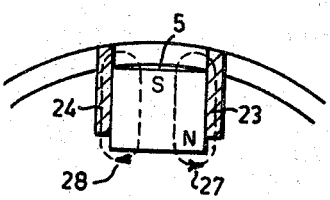
FIG. 4 shows a first structure for the concentration of the field of the lines of force of a permanent magnet of the embodiment of FIG. 1.
Figure 5:
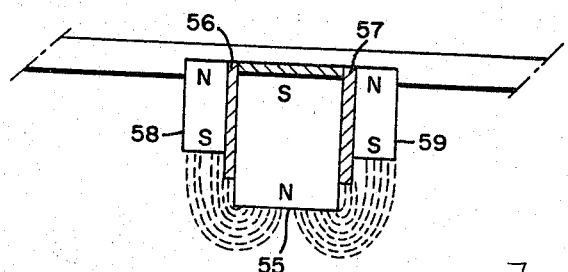
FIG. 5 shows a second structure for concentrating the field of the lines of force of a permanent magnet.

The magnet system shown in FIG. 5 comprises a main permanent magnet 55, which is surrounded, as shown in FIG. 4, by thin plates 56 and 57 of ferromagnetic material, so that the field of the lines of force is concentrated about the permanent magnet 55 itself. Moreover, the protrusion of the magnet 55 from the plates 56 and 57, compels the field of the lines of force to pass partly through the air. In order to provide a higher intensity of the field than with the system shown in FIG. 4, two auxiliary permanent magnets 58 and 59 are arranged each on one side of the plates 56 and 57 so that the poles of the auxiliary magnets, orientated towards the body in which they are not arranged, are unlike with respect to the pole of the main magnet orientated towards said body.

In FIG. 5 this is the North pole N of the main magnet 55 and the South poles S of the auxiliary magnets 58 and 59. Consequently, the field of the lines of force can close not only via the plates 56 and 57, but also via the auxiliary magnets 58 and 59, while being intensified at the same time.

The plates 56 and 57 project relatively to the South poles S of the auxiliary magnets 58 and 59. This serves to ensure that when a North pole N of the main magnet of a magnet system in one body is located opposite a South pole S of one of the auxiliary magnets of a magnet system in the other body, there is no force of attraction occurs between the facing magnet systems, since this would prevent a continuous vibratory motion. In this case, the aforedescribed vertical force would change, when a magnet system of a beam passes by a magnet system in a beam spaced therefrom, from a force of attraction into a repelling force and back again into a force of attraction. This is not desirable. Due to the aforedescribed disposition of the auxiliary magnets with a given distance between the main magnets, when positioned in such beams, the auxiliary magnets must be positioned at such a distance beneath the main magnets that the aforesaid reversal of the vertical force is substantially avoided.

If there are only forces of attraction between the magnet systems in one body and in the other, the structure remains the same; it is only necessary to invert the main magnets and the auxiliary magnets of the magnet systems of one body, for example those in one of the aforementioned beams.

In practice, the best results are obtained by providing non-magnetic material between the plates 56 and 57 and the main magnet 55 and by positioning the permanent magnets 58 and 59 on the plates 56 and 57 without the use of intermediate material.

However, as an alternative the auxiliary magnets 58 and 59 may be directly positioned on the main magnet 55, the plates 56 and 57 being positioned on either side thereof. The corresponding dimensions of the plates are the same as those of the auxiliary magnets 58 and 59.

What we claim is:

1. A vibrating device, comprising a first semi-stationary body; a permanent magnet mounted on said first body; a second body suspended adjacent to said first body and being movable relative to said first body; means for supporting said second body; a plurality of permanent magnets, mounted symmetrically on said second body and having poles of the same polarity facing towards said first body; and ferromagnetic means surrounding each permanent magnet separately for concentrating lines of force of each permanent magnet only around the pole of said permanent magnet facing that body on which said magnet is not located, said ferromagnetic means comprising first and second thin plates positioned on either side of each of said permanent magnets and first and second auxiliary permanent magnets positioned on either side of said plates, said plates extending beyond said auxiliary magnets and the permanent magnet extending beyond said plates.

2. A vibrating device, comprising a first semi-stationary body; a permanent magnet mounted in said first body; a second body suspended adjacent to said first body and being movable relative to said first body; means for supporting said second body; a plurality of permanent magnets, mounted symmetrically on said second body and having poles of the same polarity facing towards said first body; and ferromagnetic means surrounding each permanent magnet separately for concentrating lines of force of each permanent magnet only around the pole of said permanent magnet facing that body on which said magnet is not located, said ferromagnetic means comprising first and second auxiliary permanent magnets secured to either side of each of said permanent magnets and first and second thin plates of ferromagnetic material secured to either side of said auxiliary magnets.

3. A vibratory device, comprising a first semi-stationary body comprising a stator; a permanent magnet mounted on said first body; a second body suspended adjacent to said first body and being movable relative to said first body, said second body comprising a rotor of ferromagnetic material rotatably supported with respect to said stator; means for supporting said second body; a plurality of permanent magnets, mounted symmetrically on said second body and having poles of the same polarity facing towards said first body; and ferromagnetic means surrounding each permanent magnet separately for concentrating lines of force of each permanent magnet only around the pole of said permanent magnet facing that body on which said magnet is not located, said ferromagnetic means comprising first and second thin plates positioned on either side of each of said permanent magnets and first and second auxiliary permanent magnets positioned on either side of said plates, said plates extending beyond said auxiliary magnets and the permanent magnet extending beyond said plates.

4. A vibrating device according to claim 3 wherein said rotor further comprises a plurality of rod-shaped permanent magnets axially mounted thereon, a flattened face formed in said rotor on either side of said rod-shaped permanent magnets, said face having a surface which is small relative to the surface of the side of said rod-shaped permanent magnet which is oriented towards said stator body, said side extending slightly beyond the rotor body, said rotor body being partly milled away beyond said flattened face.

5. A vibrating device according to claim 4, wherein said sides of said rod-shaped permanent magnets oriented toward said stator are of the same polarity.

6. A vibrating device according to claim 3, wherein said supporting means comprises two separate resilient blocks mounted oppositely on said stator, a shaft supporting said rotor, driving means connected to a first end of said shaft and said resilient blocks supporting a second end of said shaft.

7. A vibrating device according to claim 6, further comprising a vane secured to the outside of said stator and extending in a plane through the permanent magnets mounted on said stator and said shaft.

References Cited

UNITED STATES PATENTS

| | | | |
|---|---|---|---|
| 2,585,714 | 2/1952 | Wrobel | 308—10 |
| 2,725,266 | 11/1955 | Mendelsohn | 308—10 |
| 2,790,095 | 4/1957 | Peek et al. | 310—103 |

MILTON O. HIRSHFIELD, *Primary Examiner.*

ORIS L. RADER, *Examiner.*

C. W. DAWSON, D. F. DUGGAN,
*Assistant Examiners.*